(12) United States Patent
Fujimoto et al.

(10) Patent No.: US 9,026,368 B2
(45) Date of Patent: May 5, 2015

(54) VEHICLE NAVIGATION SYSTEM

(71) Applicant: Denso Corporation, Kariya, Aichi-pref. (JP)

(72) Inventors: Hidetoshi Fujimoto, Makinohara (JP); Yasuhiro Shimizu, Tokoname (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 13/647,425

(22) Filed: Oct. 9, 2012

(65) Prior Publication Data

US 2013/0096828 A1    Apr. 18, 2013

(30) Foreign Application Priority Data

Oct. 13, 2011    (JP) .................. 2011-225840

(51) Int. Cl.
  *G01C 21/34* (2006.01)
  *G08G 1/123* (2006.01)
  *G01C 21/36* (2006.01)
(52) U.S. Cl.
  CPC .................. *G01C 21/3676* (2013.01)
(58) Field of Classification Search
  USPC ................ 701/417, 533, 410, 435; 340/995.2
  See application file for complete search history.

(56) References Cited

FOREIGN PATENT DOCUMENTS

| JP | 05188860 A | * | 7/1993 |
| JP | 2002-257570 A | | 9/2002 |
| JP | 2004-333467 A | | 11/2004 |
| JP | 2004333467 A | * | 11/2004 |
| JP | 2005-227294 A | | 8/2005 |
| JP | 2007-198855 A | | 8/2007 |
| JP | 2007198855 A | * | 8/2007 |
| JP | 2009-031073 A | | 2/2009 |
| JP | 2009031073 A | * | 2/2009 |
| JP | 2011-043437 A | | 3/2011 |
| JP | 2011043437 A | * | 3/2011 |

OTHER PUBLICATIONS

Office Action mailed Jul. 30, 2013 in the corresponding JP application No. 2011-225840 (English Translation).

* cited by examiner

*Primary Examiner* — Tuan C. To
*Assistant Examiner* — Isaac Smith
(74) *Attorney, Agent, or Firm* — Posz Law Group, PLC

(57) ABSTRACT

A vehicle navigation system includes: a route guidance element for searching an optimum route from a current position of a vehicle to a destination according to a normal map data and for guiding the optimum route by displaying the optimum route on a map screen image of a display; a deviation route retrieving element for retrieving a deviation route, which has a possibility that a user may deviate from the optimum route and enter into the deviation route although the vehicle is incapable of driving along the deviation route; and an attention notification element for outputting attention notification information in order to prevent the user from entering into the deviation route when the route guidance element guides the optimum route.

10 Claims, 4 Drawing Sheets

LEVEL 0

LEVEL 1

VEHICLE NAVIGATION SYSTEM

CROSS REFERENCE TO RELATED APPLICATION

This application is based on Japanese Patent Application No. 2011-225840 filed on Oct. 13, 2011, the disclosure of which is incorporated herein by reference.

TECHNICAL FIELD

The present disclosure relates to a vehicle navigation system having a guidance function for searching an optimum route from a starting point to a destination, and for guiding the optimum route.

BACKGROUND

A vehicle navigation apparatus mounted on a vehicle has a location function for detecting a current position of the vehicle and for overlapping the current position on a road map on a screen of a display, and a route guidance function for searching an optimum route from a starting point to a destination and for guiding the optimum route visually with displaying a map and audibly with outputting sound. A user utilizes the route guidance function of the apparatus, so that the user can reach the destination surely without losing the route to the destination and without going a long way around even if the user goes to the destination for the first time and the user passes through an unfamiliar road.

In the above case, the route guidance function provides to set one route or one type of route to the destination and to guide the one route. However, JP-2005-227294 teaches that multiple routes from a starting point to an end point are searched based on different searching conditions such as a minimum driving time condition, a minimum driving distance condition and a minimum cost condition. When the vehicle reaches a branch point of multiple routes, the display displays an enlarged diagram near the branch point. Further, the display displays information about the searching conditions relating to the routes from the branch point. The user can selects one of the routes in view of the information about the searching conditions.

When the apparatus executes the route guidance process, the display displays a road map around the current position of the vehicle in front of a driving direction, and displays the optimum route, which has a color different from other roads. For example, the optimum route is blue. When the user looks at the map on the display screen, and the user determines that it is better for the user to passes through another route rather than the optimum route, the user may drive the vehicle on the other route deviated from the optimum route. Alternatively, the user may ignore the optimum route and drive the vehicle through another route.

SUMMARY

It is an object of the present disclosure to provide a vehicle navigation system having a route guidance function for guiding an optimum route. The navigation system prevents a wrong route drive, i.e., the navigation system prevents a driver from driving a vehicle along a wrong route deviated from the optimum route. The driver makes judgments by himself or herself to switch from the normal route to the wrong route, although, in the wrong route, the driver can not drive the vehicle along the route.

According to an aspect of the present disclosure, a vehicle navigation system includes: a route guidance element for searching an optimum route from a current position of a vehicle to a destination according to a normal map data and for guiding the optimum route by displaying the optimum route on a map screen image of a display; a deviation route retrieving element for retrieving a deviation route, which has a possibility that a user may deviate from the optimum route and enter into the deviation route although the vehicle is incapable of driving along the deviation route; and an attention notification element for outputting attention notification information in order to prevent the user from entering into the deviation route when the route guidance element guides the optimum route.

In the above system having the route guidance element for guiding the optimum route, the system prevents the user from deviating from the normal route and entering into the deviation route according to the user's determination.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

The present inventors study a case where a user may drive a vehicle on another route deviated from an optimum route. Further, the present inventors study a case where the user may ignore the optimum route and drive the vehicle through another route.

Figure 4A:
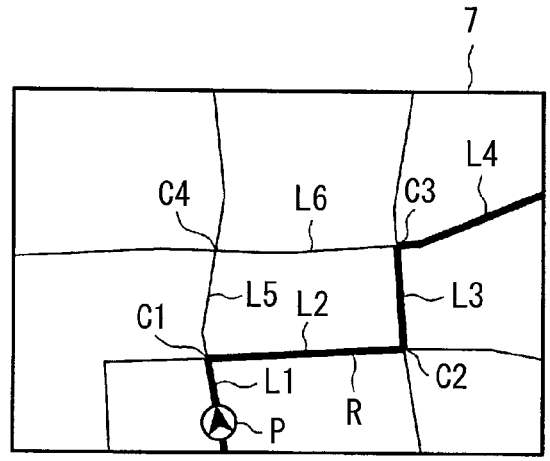
FIG. 4A is a diagram showing a normal route when an apparatus guides an optimum route.
Figure 4B:
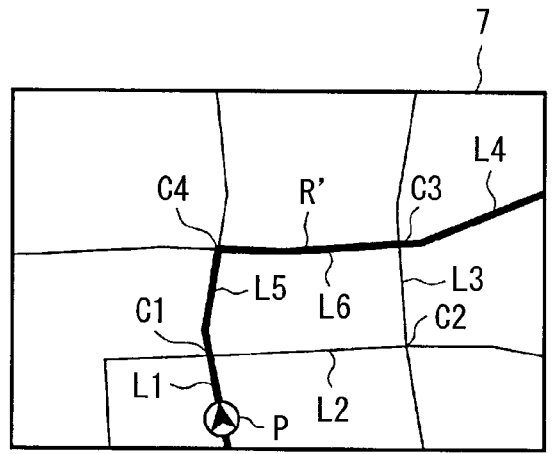
FIG. 4B is a diagram showing another route when a user makes judgments to switch from the normal route to the other route.

An example of the above issue is shown in FIGS. 4A and 4B. A display 7 displays a map and a current position P of the vehicle on a screen in such a manner that the current position P is disposed on a lower side of a center portion of the map, and a driving direction of the vehicle directs to an up side of the map. In the map, a road (i.e., a link) is shown as a gray line, and an optimum route R is shown as a blue line. In FIGS. 4A and 4B, the road is shown as a thin line, and the optimum route R is shown as a thick line. As shown in FIG. 4A, the link L1, the intersection (i.e., a node) C1, the link L2, the intersection C2, the link L3, the intersection C3 and the link L4 are connected in this order so that the vehicle passes through this route as a normal route R equal to the optimum route. In this case, the intersection C4 looks like a node, at which the vehicle can turn right, at a glance in view of connection of lines. Actually, the intersection C4 is a grade separation intersection, and therefore, the vehicle can not turn right and left.

However, the user can not acknowledge that the intersection C4 is the grade separation intersection when the user sees the map on the screen at a glance. Thus, the user may misunderstand that the vehicle can turn right or left at the intersection C4. In this case, the user may try to drive the vehicle along another route R' without passing through the normal route R since the vehicle goes a long way around when the vehicle passes through the normal route R or since the number of turning times in case of the normal route R is larger than that in case of the other route R, so that it is not an easy drive when the vehicle passes through the normal route R. Here, the other route R' is shown in FIG. 4B, and the other route R' includes the link L1, the link L5, the intersection C4, the link L6, and the link L4, which are connected in this order. In this case, when the vehicle goes along the link L5, the user finds that the vehicle can not turn right at the intersection C4. Thus, the user has to go a long way round in order to return to the normal route R, and therefore, the user may waste time, or the user may be disadvantaged.

In view of the above issues, the present inventors provide a vehicle navigation apparatus as follows.

In a present embodiment, an optimum route from a current position of a vehicle to a destination is searched at an information center. Thus, a vehicle navigation apparatus obtains the optimum route from the information center, and therefore, the navigation apparatus is defined as an information center calculation type navigation apparatus. Alternatively, the vehicle navigation apparatus may calculate or search the optimum route therein.

Figure 1:
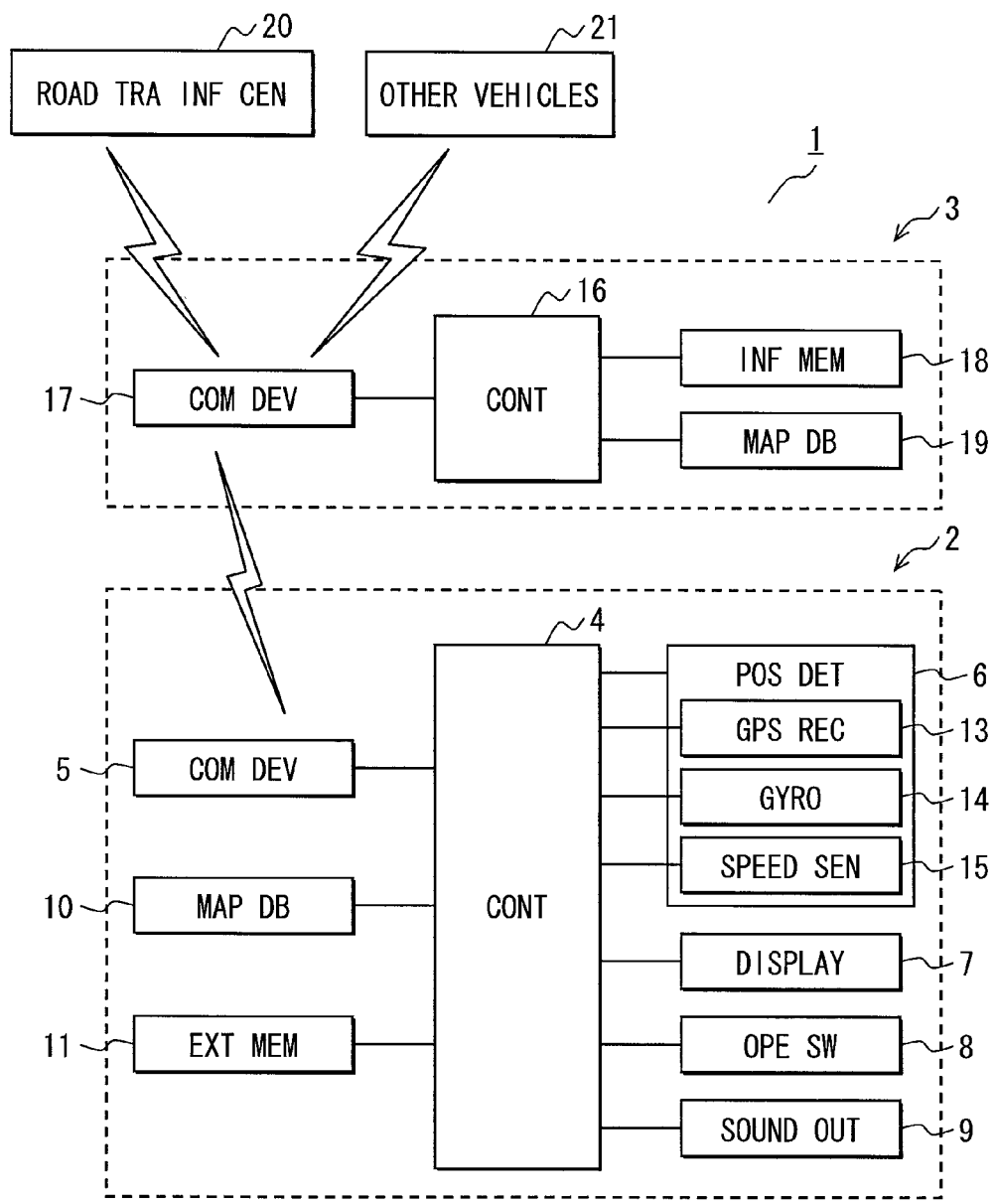
FIG. 1 is a block diagram showing a whole construction of a vehicle navigation system.

FIG. 1 shows the vehicle navigation system 1 according to the present embodiment. The system 1 includes a vehicle navigation apparatus 2 mounted on the vehicle and an information center 3.

The apparatus 2 includes a controller 4 for controlling a whole of the apparatus 2, a communication device 5 coupled with the controller 4 and communicating with an external device wirelessly, a position detector 6 (i.e., a vehicle position detecting element) for detecting a current position of the vehicle, a display 7 as a displaying device such as a full color liquid crystal display, an operation switches 8 (i.e., an operation setting element) arranged as a touch panel on a surface of the display 7 or arranged near the display 7 and including a mechanical switch, a sound output device 9, a map database 10, an external memory 11 for storing various information, and the like. The controller 4 includes mainly a CPU or a computer.

The position detector 6 includes a GPS receiver 13, a gyro sensor 14 and a vehicle speed sensor 15. The GPS receiver 13 provides a part of a GPS (global positioning system) for detecting the current position of the vehicle based on a transmission electric wave from an artificial satellite for the GPS. The gyro sensor 14 detects a rotational angular speed of the vehicle. With using a software constitution and/or a hardware constitution, the controller 4 detects the current position of the vehicle as an absolute position, a driving direction, a vehicle speed, a driving distance, current time and the like based on input signals from various sensors 13-15, which provide the position detector 6.

Figure 5:
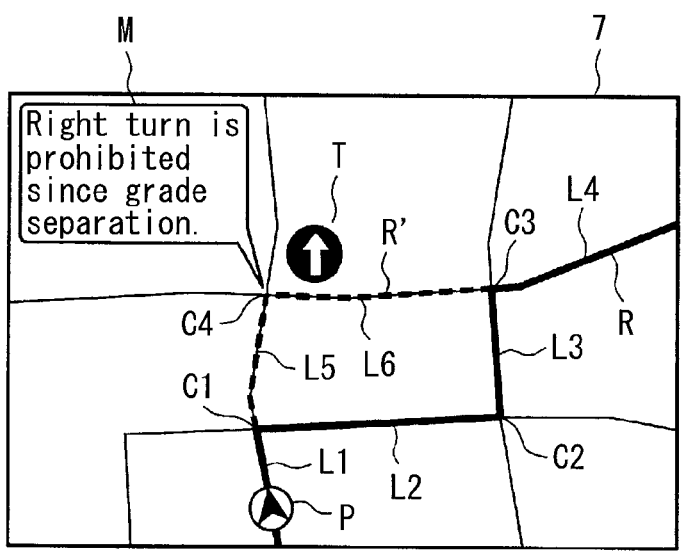
FIG. 5 is a diagram showing an example of a display screen when the apparatus provides the information calling for attention.

Based on the current position and the map data obtained from the map database 10, as shown in FIGS. 4A and 5, the apparatus executes a location function such that the display 7 displays the road map around the vehicle together with the current position P of the vehicle and the driving direction, which are overlapped on the map. In this case, when the apparatus performs the location function, the apparatus performs a map matching process for comparing and checking a driving trajectory of the vehicle and a road shape of the map data so that the road, on which the vehicle is running at the present time, is estimated. Thus, the map matching process provides that the current position of the vehicle is positioned on the road of the electrical map.

The map database 10 stores the map data of a whole of a domestic area and facility data such as various facilities and shops, which is accompanied with the map data. The map data includes a road network for representing the road of the map as a line. The intersection is defined as a node. The road is divided by the nodes into multiple sections. A section between two nodes is defined as a link. Thus, the map data includes link data for presenting a link and node data for presenting a node. The link data includes a link ID of each link as an identifier of the link, a link length, position data of a starting point (i.e., one node) of each link and an end point (i.e., the other node) of each link, an angle (i.e., a direction) data, a width of a road, a type of a road and the like. The link ID is specific to a corresponding link. The position data of each node includes a longitude and a latitude of the node. Further, the link data includes information for displaying (i.e., reproducing) the link on the map of the display 7.

The apparatus 2, specifically, the controller 4 communicates with the information center 3 via the communication devices 5, 17 through a communication network such as a cell phone network as communication medium. The communication device 5 is a wireless communication device such as a cell phone and a DCM (i.e., data communication module). The communication device 5 may be one of various communication tools. Specifically, as described later, when the apparatus 2 communicates with the information center 3 via the communication device 5, the apparatus 2 can receive information about a route guidance data, which corresponds to data of an optimum route R, in real time. Further, the apparatus 2 can receive information calling for attention, which corresponds to information about a deviation route R, in real time.

The apparatus 2 transmits information about the current position as the starting point and the destination to the information center 3 via the communication device 5, according to operation of the switches 8 performed by the user. Further, the apparatus 2 receives the information about the optimum route R as the normal route, which is calculated in the information center 3. The information about the starting point and the destination is defined as the starting point data and the destination data. The information about the optimum route R is defined as route guidance data. The apparatus 2 executes a route guidance process based on the route guidance data of the normal route R. The route guidance process provides to display the normal route R, along which the vehicle is to run, on the screen of the display 7, as shown in FIG. 4A such that the normal route R is displayed as a color line, and overlapped on the road map. In FIG. 4A, the normal route R is shown as a thick line. Further, the route guidance process provides to output a guidance voice message such as a message for instructing a right turn or a left turn with using the sound output device 9. Thus, the apparatus 2 performs the route guidance function.

As shown in FIG. 1, the information center 3 includes a controller 16 provided by a computer, a communication device 17 as a communication tool for communicating with an external device wirelessly, an information memory 18 for storing various information relating to the route search process, a map database 19 as a memorizing element for storing the map data, and the like. The communication device 17 is coupled with the controller 16. The communication device 17 performs wireless communication with the communication device 5 of the apparatus 2 via a telematics technology.

The communication device 17 further communicates with a road traffic information center 20, an apparatus mounted on another vehicle 21, and the like. The road traffic information center 20 is administered by a road administration office, each state, each prefecture, or a police office. Thus, the information center 2 can receive latest data such as road traffic information and meteorological information from the road traffic information center 20 and/or the apparatus mounted on another vehicle 21. The road traffic information includes traffic jam information, traffic accident information, road construction information, traffic lane control information, traffic restriction information and the like. The meteorological information includes weather information, wind direction information, road surface condition information and the like. Thus, the information center 2 collects various information, and controls the information memory 18 to store the road traffic information and the meteorological information, so that the road traffic information and the meteorological information are used for searching the optimum route.

The map database 19 stores latest map data used for searching the optimum route. The map data includes a road network such that the road on the map is defined as a line. The intersection and the like are defined as a node. Thus, the road is divided into multiple sections by multiple nodes. Each section between nodes is defined as a link. Thus, the map data includes link data. The link data includes a link ID, a link length, position data of a starting point of the link, position data of an ending point of the link, angle data or direction data, a road width, a type of the road, and the like.

Figure 3A:
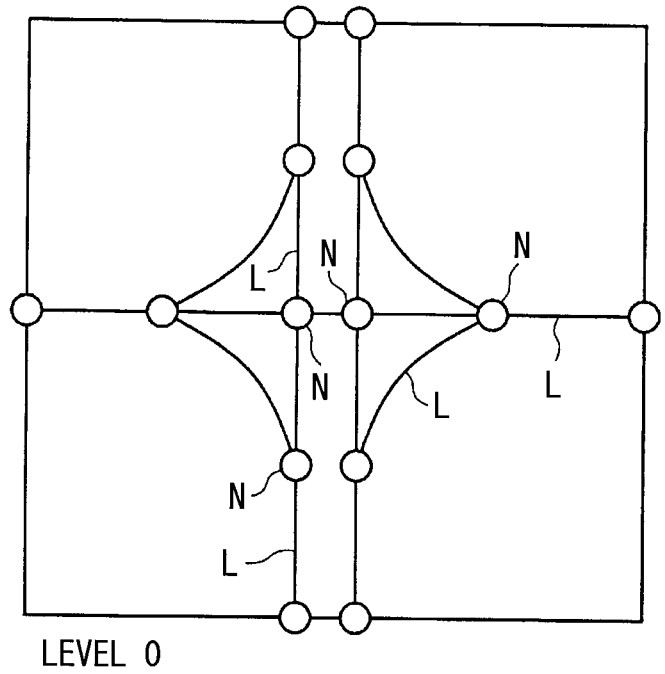
FIG. 3A is a diagram showing a lower level map data.
Figure 3B:
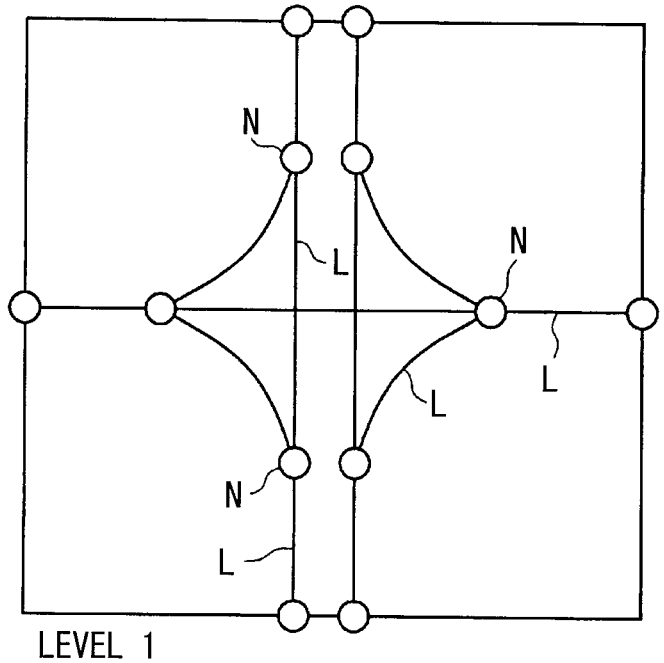
FIG. 3B is a diagram showing a normal level map data.

In the present embodiment, the map database 19 stores both of normal map data and map data without traffic regulation. The normal map data has a normal level for navigating the route, so that the normal map data has a level-1 structure such as "ISO/TC204 ITS map data file (i.e., GDF)." The map data without traffic regulation has a lower level, so that the map data without traffic regulation has a level-0 structure such as "ISO/TC204 ITS map data file (i.e., GDF)." Specifically, the map data without traffic regulation is prepared by invalidating the traffic restriction information, the grade separation information, the road type information and the like in the normal level map data. The map data without traffic regulation is defined as traffic regulation invalidation map data. FIG. 3A shows the traffic regulation invalidation map data having the lower level, and FIG. 3B shows the normal map data having the normal level. Specifically, FIGS. 3A and 3B show an example of a part of the map, which is provided by an image diagram.

The normal map data is formed by a standard format for vehicle navigation system such as KIWI format. The normal map data includes road continuity (i.e., road connection) information, traffic regulation information such as right/left turn prohibition information at an intersection, one-way traffic information and the like. As shown in FIG. 3B, at the grade separation intersection, the road links L intersect with each other without node N. Here, the node N is shown as an open circle.

The traffic regulation invalidation map data is formed by the map format equal to the normal map data. However, the traffic regulation information such as right/left turn prohibition information at an intersection, and one-way traffic information is invalidated in the traffic regulation invalidation map data, i.e., the traffic regulation information is not set in the traffic regulation invalidation map data. As shown in FIG. 3A, all intersections and branch points of the links are set to be nodes N. Therefore, even if the intersection is the grade separation intersection, the node N is set at the intersection so that the roads are connected at the intersection. Specifically, even if the intersection is the grade separation intersection, the vehicle can turn right or left at the intersection. Therefore, the traffic regulation invalidation map data is prepared by invalidating, i.e., deleting the traffic regulation information, so that the grade separation intersection is drawn as a normal intersection without grade separation. In the traffic regulation invalidation map data, all intersections are set to be the normal intersections, and further, the road type is not defined, i.e., invalidated.

When the controller 16 communicates with the apparatus 2 so that the controller 16 receives information about the current position of the vehicle and the destination from the vehicle navigation apparatus 2, the controller 16 searches the optimum route, and the controller 16 transmits the route guidance data of the optimum route R to the apparatus 2. In this case, the controller 16 calculates, i.e., searches the optimum route from the current position as the starting point to the destination according to the normal map data in the map database 19. The calculation of the optimum route is performed by the Dijkstra method such that the cost from the starting point to the destination is minimized. When the controller 16 executes the route calculation, the information such as the latest road traffic information stored in the information memory 18 is also taken into account.

In the present embodiment, the controller 16 searches the optimum route R, and further, the controller 16 retrieves the deviation route R', which is defined such that the user may deviate from the normal route R and enter into the deviation route R' although the vehicle can not pass through the deviation route R' instead of the normal route R. The controller 16 outputs the information calling for attention, i.e., the attention notification information to the apparatus 2. The attention notification information provides to notify the user of the attention to prevent the user from deviating from the normal route R to the deviation route R' when the apparatus 2 executes the route guidance process to the destination. Based on the attention notification information, the apparatus 2 outputs and notifies the attention notification information to the user.

Specifically, as described later, when the controller 16 retrieves the deviation route R, the controller 16 calculates the traffic regulation invalidation route according to the traffic regulation invalidation map data when the controller 16 searches the route from the starting point to the destination such as a minimum distance route. As shown in FIGS. 4A and 4B, the controller 16 detects the difference between the normal route R obtained with using the normal map data and the traffic regulation invalidation route, so that the controller 16 retrieves a part of the traffic regulation invalidation route, which is deviated from the normal route R, and the controller 16 defines the part of the traffic regulation invalidation route as the deviation route R.

The controller 16 transmits information about the normal route R to the apparatus 2. Further, the controller 16 transmits information about the deviation route R' and the attention notification information for notifying the attention to the user in order to prevent the user from entering into the deviation route R. In this case, the controller 16 may transmit all information including the information about the deviation route R' and the attention notification information together with the information about the normal route R. Alternatively, the controller 16 may transmit a part of the attention notification information corresponding to a part of the deviation route R' at certain timing just before the apparatus outputs the attention notification information.

When the apparatus 2 receives the information about the deviation route R' and the attention notification information from the information center 3, the apparatus 2 outputs the attention notification information when the apparatus executes the route guidance process to the destination with the normal route R so that the user prevents from entering into the deviation route R. In the present embodiment, the output process of the attention notification information is performed such that the display 7 displays the deviation route R, which is distinguishable from the normal route R on the display 7 when the display 7 displays and guides the normal route R on the screen of the display 7, as shown in FIG. 5. Thus, the controller 4 and the display 7 in the apparatus perform the attention notification function for outputting the attention notification information to the user.

Specifically, as shown in FIG. 5, the controller 4 outputs the attention notification information when the vehicle proceeds to drive, and the display 7 displays the deviation route R' (i.e., the branch point C1) on the screen. Alternatively, the controller 4 may output the attention notification information when the current position P of the vehicle is disposed at a certain point, which is a predetermined distance L such as a few hundreds meters before the branch point C1. At the branch point C1, the vehicle deviates from the normal route R to the deviation route R. Further, when the controller 4 outputs the attention notification information, the scale of the map to be displayed may be changed. For example, the map on the display 7 may be enlarged so that a map in a comparatively small area is displayed.

In the present embodiment, the display 7 displays the deviation route R' and the normal route R in different colors. For example, the deviation route R' is displayed as a red dot line. In FIG. 5, the deviation route R' is shown as a thick dot line. Further, the display 7 displays a message or a mark, which represents that the vehicle can not run along the deviation route R' or it is not recommended to go through the deviation route R. In FIG. 5, at the intersection C4, the display 7 displays a mark T of a traffic sign for representing that the vehicle can not turn right and left or the vehicle can go straight only. Further, the display 7 displays a message M for representing that "Right turn is prohibited since grade separation."

Figure 2:
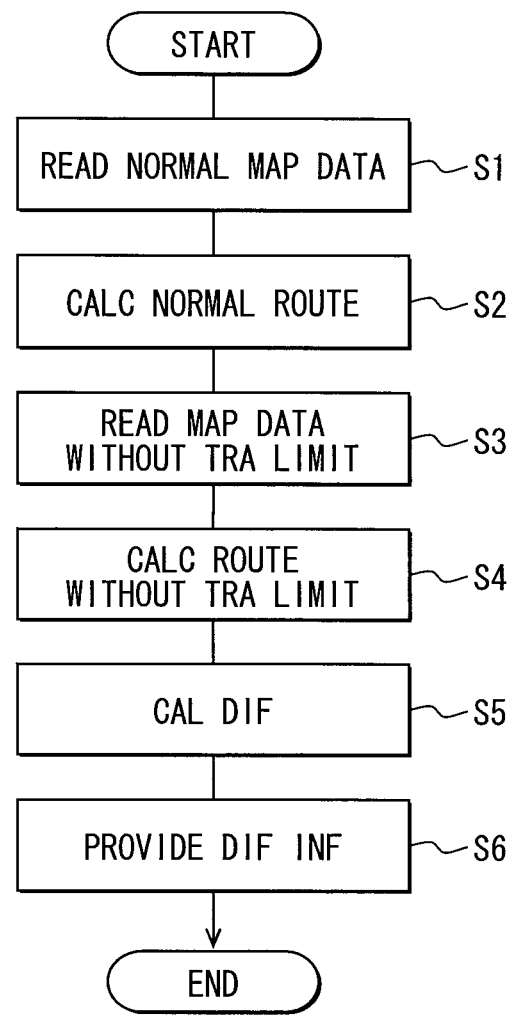
FIG. 2 is a diagram showing a flowchart of a process for outputting information calling for attention.

Next, the function of the above constitution will be explained with reference to FIGS. 2, 4 and 5. FIG. 2 shows a process procedure executed by the controller 16 of the information center 3 and the controller 4 of the apparatus 2 when the vehicle navigation system 1 performs the route guidance function. The process procedure relates to the retrieve process of the deviation route R, and the output process of the attention notification information.

Specifically, when the apparatus 2 transmits the data about the current position and the destination of the vehicle, the controller 16 of the information center 3 reads the normal map data from the map database 19 in step S1. In step S2, the controller 16 calculates the optimum route R as the normal route R from the current position as the starting point to the destination according to the normal map data.

Next, in step S3, the controller 16 reads the traffic regulation invalidation map data from the map database 19. In step S4, the controller 16 calculates the traffic regulation invalidation route from the same starting point to the same destination. In this case, the traffic regulation invalidation route obtained from the traffic regulation invalidation map data includes the roads, which the vehicle actually can not go through, but the user may misunderstand that the vehicle can go through when the user looks at the map at first glance. For example, the roads includes the grade separation intersection, the intersection at which the vehicle can not turn right and left, and a time zone traffic regulation road.

In step S5, the difference between the normal route R calculated in step S2 and the traffic regulation invalidation route calculated in step S4 is calculated, so that the a part of the traffic regulation invalidation route, which is deviated from the normal route R, is retrieved as the deviation route R.

Here, FIG. 4A and 4B show a part of the normal route R and a part of the traffic regulation invalidation route. As shown in FIG. 4A, in the normal route R, the link L1, the intersection (i.e., a node) C1, the link L2, the intersection C2, the link L3, the intersection C3 and the link L4 are connected in this order. As shown in FIG. 4B, in the traffic regulation invalidation route, the link L1, the intersection C1, the link L5, the intersection C4, the link L6, the intersection C3 and the link L4 are connected in this order.

In the above case, when the user views the traffic regulation invalidation map, the user may recognize that the driving distance along the traffic regulation invalidation route is shorter than the normal route R, or the number of turns in the traffic regulation invalidation route is smaller than the normal route R. However, actually, since the intersection C4 is the grade separation intersection, the vehicle can not turn right and left. In the example in FIGS. 4A and 4B, in step S5, the deviation route R' is retrieved as a route from the intersection C1 to the intersection C3 through the link L5, the intersection C4 and the link L6.

In step S6, the apparatus 2 outputs the attention notification information and the information about the deviation route R, which relate to the information about the deviation route R' as the calculation result of difference between the normal route R and the traffic regulation invalidation route in step S5. The attention notification information and the information about the deviation route R' is transmitted from the information center 3 to the apparatus 2 together with the information about the normal route R. Alternatively, after the information about the normal route R is transmitted, each part of the attention notification information and the information about the deviation route R' may be transmitted at a certain timing, for example, just before the apparatus 2 outputs the attention notification information, or at certain time by predetermined time prior to the time when the apparatus 2 outputs the attention notification information.

The apparatus 2 executes the route guidance process of the normal route R, and further, the apparatus 2 outputs the attention notification information at appropriate timing. The output of the attention notification information is executed when the vehicle proceeds to drive along the normal route R, and the deviation route R' and/or the branch point C1 is displayed on the display 7. Here, not shown in FIGS. 4A and 4B, when the apparatus 2 starts to execute the route guidance process, a whole of the normal route R is displayed. In this case, the display 7 may display the deviation route R' with respect to the normal route R such that the deviation route R' is displayed in a different color.

As shown in FIG. 5, the deviation route R' passing through the intersection C1, the link L5, the intersection C4 and the link L6, which has a possibility for the user to mistakenly select the deviation route R' and to mistakenly enter into the deviation route R, is displayed on the display 7 in a different color from the normal route R. Further, the display 7 displays the message representing the reason why the vehicle can not go through he deviation route R' or the reason why the deviation route R' is not recommended. In FIG. 5, the mark T of the traffic sign representing that the vehicle can not turn right and left, i.e., the vehicle can go straight only is displayed near the intersection C4. Further, the signage message M for representing that "Right turn is prohibited since grade separation" is displayed.

When the user look at the attention notification information on the screen of the display 7, the user easily understand that the intersection C4 is the grade separation intersection, and the vehicle can not turn right and left at the intersection C4 even if the vehicle drives from the intersection C1 to the link L5. Accordingly, the user determines that the vehicle turns right at the intersection C1 and goes through the link L2 without proceeding from the intersection C1 to the link L5. In this case, the vehicle runs along the normal route R. The apparatus 2 prevents the user from occurring an incident such that the user realizes that the vehicle can not turn right at the intersection C4 after the vehicle enters into the link L5. Thus, the apparatus 2 prevents the user from going a long way round in order to return to the normal route R, and from wasting time.

In the vehicle navigation system 1 according to the present embodiment, the apparatus 2 guides the normal route R to the user by performing the route guidance process. When the normal route R is searched, the deviation route R, which is defined such that the user may mistakenly deviate from the normal route R to the deviation route R' and enter into the deviation route R, is also retrieved. In order to prevent the user from entering into the deviation route R, the apparatus 2 outputs the attention notification information to the user. Accordingly, in the present embodiment, the system 1 has the route guidance function for guiding the optimum route R as the normal route and prevents the user from deviating from the normal route according to the user's judgments and entering into the deviation route R, along which the drive can not drive the vehicle.

In the present embodiment, the system 1 calculates the difference between the normal route R obtained from the normal map data and the traffic regulation invalidation route from the current position to the destination obtained from the traffic regulation invalidation map data, so that the system 1 retrieves the deviation route R, which is deviated from the normal route R. Thus, the system 1 can surely retrieve the deviation route R, which may be mistakenly selected by the user.

Specifically, in the present embodiment, the map database 19 stores both of the normal map data and the traffic regulation invalidation map data. Thus, the system can execute the process for searching the normal route R and the process for searching the traffic regulation invalidation route merely by switching between the normal map data and the traffic regulation invalidation map data. Thus, the system easily executes both processes. The system 1 is the center calculation type system such that the apparatus 2 communicates with the information center 3 so that the apparatus 2 obtains the information about the normal route R and the deviation route R' and the attention notification information from the information center 3. Thus, the load for calculating the normal route R and the deviation route R' in the apparatus 2 and the memory capacity in the apparatus 2 are reduced.

In the present embodiment, since the apparatus 2 outputs the attention notification information and displays the attention notification information on the display 7 when the deviation route R' is displayed, the apparatus 2 notifies the attention notification information to the user just after the deviation route R' is displayed on the display 7. The apparatus 2 prevents the user from determining on the user's own accord that the user drives the vehicle to enter into the deviation route R. The output of the attention notification information is performed such that the deviation route R' is distinguishably displayed from the normal route R on the screen of the display 7. Thus, since the mark T and the signage message M are displayed simultaneously, the apparatus 2 provides the display, which is easily understandable for the user. The apparatus effectively outputs the attention notification information.

In the present embodiment, the map database 19 stores both of the normal map data and the traffic regulation invalidation map data. Alternatively, the map database 19 may store one common map data, which provides to switch between the validation and the invalidation of the grade separation intersection information and the traffic regulation information. Then, the validation and the invalidation are controlled according to a case where the normal route is searched and a case where the traffic regulation invalidation route is searched. Thus, the data volume of the map data to be stored in the map database 19 is reduced.

In the above embodiment, the output of the attention notification information is performed only by the display 7. Alternatively, the output of the attention notification information may be performed by both of the display 7 and the sound output device 9. Specifically, the sound output device 9 outputs the synthesized voice message. For example, the sound output device 9 outputs the message "Please turn right at the next intersection. You can not turn right at an intersection ahead of the next intersection." Thus, the apparatus 2 effectively performs the attention notification.

Here, for example, in a case where a user seldom deviates from the normal route R in view of the user's determination, if the apparatus 2 outputs the attention notification information every time, the output of the attention notification information may bother the user. Thus, the external memory 11 may store the driving record of the user, and the apparatus 2 determines the number of times the user ignores the normal route R and deviates from the normal route R so that the user drives the vehicle along the deviation route R' or other routes. Here, the number of times represents the number of times that the user ignores the guidance of the apparatus 2 when the apparatus 2 executes the route guidance once. The apparatus 2 provides a frequency determination element for calculating the frequency of times that the user ignores the guidance. When the frequency of times exceeds a predetermined frequency as a threshold value, the apparatus 2 executes the output of the attention notification information. When the frequency of times is equal to or smaller than the predetermined frequency, the apparatus 2 stops executing the output of the attention notification information, or the apparatus 2 temporary halts the output of the attention notification information.

In this case, in a case where the user seldom deviates the normal route R according to the user's determination, the apparatus 2 stops outputting the attention notification information. Thus, the apparatus 2 prevents from bothering the user. Alternatively, the apparatus 2 may includes a setting element such as an operation switch for setting the execution and the stop of the output of the attention notification information. Thus, the user can select the execution and the stop. When the user determines that it is not necessary for the user to output the attention notification information, the user can control the apparatus 2 to temporary stop outputting the attention notification information.

In the present embodiment, the system includes the information center calculation type navigation apparatus. Alternatively, the apparatus 2 may search the optimum route, and/or the apparatus 2 may retrieve the deviation route. Further, a whole of the vehicle navigation system 1, a hardware construction of the apparatus 2, and the display manner of the display 7 may be changeable.

The above disclosure has the following aspects.

According to an aspect of the present disclosure, a vehicle navigation system includes: a route guidance element for searching an optimum route from a current position of a vehicle to a destination according to a normal map data and for guiding the optimum route by displaying the optimum route on a map screen image of a display; a deviation route retrieving element for retrieving a deviation route, which has a possibility that a user may deviate from the optimum route and enter into the deviation route although the vehicle is incapable of driving along the deviation route; and an attention notification element for outputting attention notification information in order to prevent the user from entering into the deviation route when the route guidance element guides the optimum route.

In the above system having the route guidance element for guiding the optimum route, the system prevents the user from deviating from the normal route and entering into the deviation route according to the user's determination.

Alternatively, the deviation route retrieving element may calculate a difference between a normal route and a traffic regulation invalidation route so that the deviation route retrieving element retrieves a part of the traffic regulation invalidation route, which deviates from the normal route, as the deviation route. The normal route is obtained by searching the optimum route with using the normal map data. The traffic regulation invalidation route is obtained by searching a route from the current position to the destination with using a traffic regulation invalidation map data. The traffic regulation invalidation map data is prepared by invalidating traffic regulation information and grade separation intersection information in the normal map data. In this case, the traffic regulation invalidation route includes a road having a grade separation intersection and an intersection at which the vehicle can not turn right and left, and a time zone traffic regulation road, which the vehicle can not actually passes through, but the user may misunderstand that the vehicle can passes through when the user look at the map at a glance. Thus, the apparatus surely retrieves the deviation route.

Alternatively, the vehicle navigation system may further include: a memory for storing the normal map data and the traffic regulation invalidation map data. In this case, the searching of the normal route and the searching of the traffic regulation invalidation route are performed easily.

Alternatively, the memory may store one common map data, in which activation and invalidation of the traffic regulation information and grade separation intersection information are switchable. When the normal route is obtained by searching the optimum route, the invalidating traffic regulation information and grade separation intersection information are activated in the one common map data. When the traffic regulation invalidation route is obtained, the traffic regulation information and grade separation intersection information are invalidated in the one common map data. In this case, the data amount of the map data to be stored in the memory is reduced.

Alternatively, the attention notification element may output the attention notification information when the display displays the deviation route on the map screen image. In this case, when the vehicle proceeds along the normal route, and the display starts to display the deviation route, the apparatus notifies attention to the user. The apparatus prevents the user from deviating from the normal route.

Alternatively, the attention notification element may output the attention notification information in such a manner that the deviation route is displayed on the map screen image to be distinguishable from the normal route. Thus, the apparatus visually notifies the attention to the user so as not to enter into the deviation route. Further, the attention notification element may output the attention notification information in such a manner that the display displays a signage message on the map screen image. In this case, the apparatus notifies the attention effectively.

Alternatively, the attention notification element may output the attention notification information in such a manner that a voice message regarding the attention notification information is output. In this case, the apparatus effectively outputs the attention notification information.

Alternatively, the vehicle navigation system may further include: a frequency determination element for calculating a frequency of times that the user deviates from the normal route and enters into the deviation route. When the frequency of times exceeds a predetermined value, the attention notification element outputs the attention notification information. When the frequency of times is equal to or smaller than the predetermined value, the attention notification element stops outputting the attention notification information. Alternatively, the vehicle navigation system may further include a setting element for setting execution and stop of outputting the attention notification information. In these cases, when it is not necessary to output the attention notification information, the apparatus stops outputting the attention notification information. Thus, the apparatus prevents from bothering the user.

Alternatively, the vehicle navigation system may further include: a vehicle apparatus mounted on the vehicle; and an external information center disposed on an outside of the vehicle. The vehicle apparatus communicates with the information center so that the vehicle apparatus receives information about the optimum route and the deviation route and the attention notification information from the information center. The vehicle apparatus receives the attention notification information according to timing for outputting the attention notification information. In this case, a load for executing various processes and a memory capacity in the vehicle apparatus are reduced.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle navigation system comprising:
    a route guidance function element for searching an optimum route from a current position of a vehicle to a destination according to a normal level map data and for guiding the optimum route by displaying the optimum route on a map screen image of a display;
    a deviation route retrieving element for retrieving a deviation route, which has a possibility that a user may deviate from the optimum route as a normal route to the destination recommended by the route guidance function element and enter into the deviation route although the vehicle is incapable of driving into the deviation route from the normal route; and
    an attention notification element for outputting attention notification information in order to prevent the user from entering into the deviation route when the route guidance function element guides the optimum route to the destination,
    wherein the deviation route retrieving element calculates a difference between the normal route and a traffic regulation invalidation route so that the deviation route retrieving element retrieves a part of the traffic regulation invalidation route, which deviates from the normal route, as the deviation route, wherein the normal route is obtained by searching the optimum route from the current position to the destination recommended by the route guidance function element with using the normal level map data for navigation, wherein the traffic regulation invalidation route is obtained by searching a route from the current position to the destination with using a traffic regulation invalidation map data, which is a lower level than the normal level map data, and wherein the traffic regulation invalidation map data is prepared by invalidating traffic regulation information in the normal level map data and setting a node at a grade separation intersection to connect roads at the grade separation intersection.

2. The vehicle navigation system according to claim 1, further comprising:

a memory for storing map data, which stores the traffic regulation invalidation map data having the lower level and the normal level map data.

3. The vehicle navigation system according to claim 1 further comprising:

a memory for storing map data, which stores one common map data, in which activation and invalidation of the traffic regulation information and grade separation intersection information are switchable, wherein, when the normal route is obtained by searching the optimum route, the invalidating traffic regulation information and grade separation intersection information are activated in the one common map data, and wherein, when the traffic regulation invalidation route is obtained, the traffic regulation information and grade separation intersection information are invalidated in the one common map data.

4. The vehicle navigation system according to claim 1, wherein the attention notification element outputs the attention notification information when the display displays the deviation route on the map screen image.

5. The vehicle navigation system according to claim 1, wherein the attention notification element outputs the attention notification information in such a manner that the deviation route is displayed on the map screen image of the display to be distinguishable from the normal route.

6. The vehicle navigation system according to claim 5, wherein the attention notification element outputs the attention notification information in such a manner that the display displays a signage message on the map screen image.

7. The vehicle navigation system according to claim 1, wherein the attention notification element outputs the attention notification information in such a manner that a voice message regarding the attention notification information is output.

8. The vehicle navigation system according to claim 1, further comprising:

a frequency determination element for calculating a frequency of times that the user deviates from the normal route and enters into the deviation route, wherein, when the frequency of times calculated by the frequency determination element exceeds a predetermined value, the attention notification element outputs the attention notification information, and wherein, when the frequency of times is equal to or smaller than the predetermined value, the attention notification element stops outputting the attention notification information.

9. The vehicle navigation system according to claim 1, further comprising:

a setting element for setting, by the user, execution and stop of outputting the attention notification information via the attention notification element.

10. The vehicle navigation system according to claim 1, further comprising:

a vehicle apparatus mounted on the vehicle; and an external information center disposed on an outside of the vehicle, wherein the vehicle apparatus communicates with the information center so that the vehicle apparatus receives information about the normal route to be recommended and the deviation route and the attention notification information from the information center, wherein the vehicle apparatus receives the attention notification information according to a timing for outputting the attention notification information.

* * * * *